Figure 1:
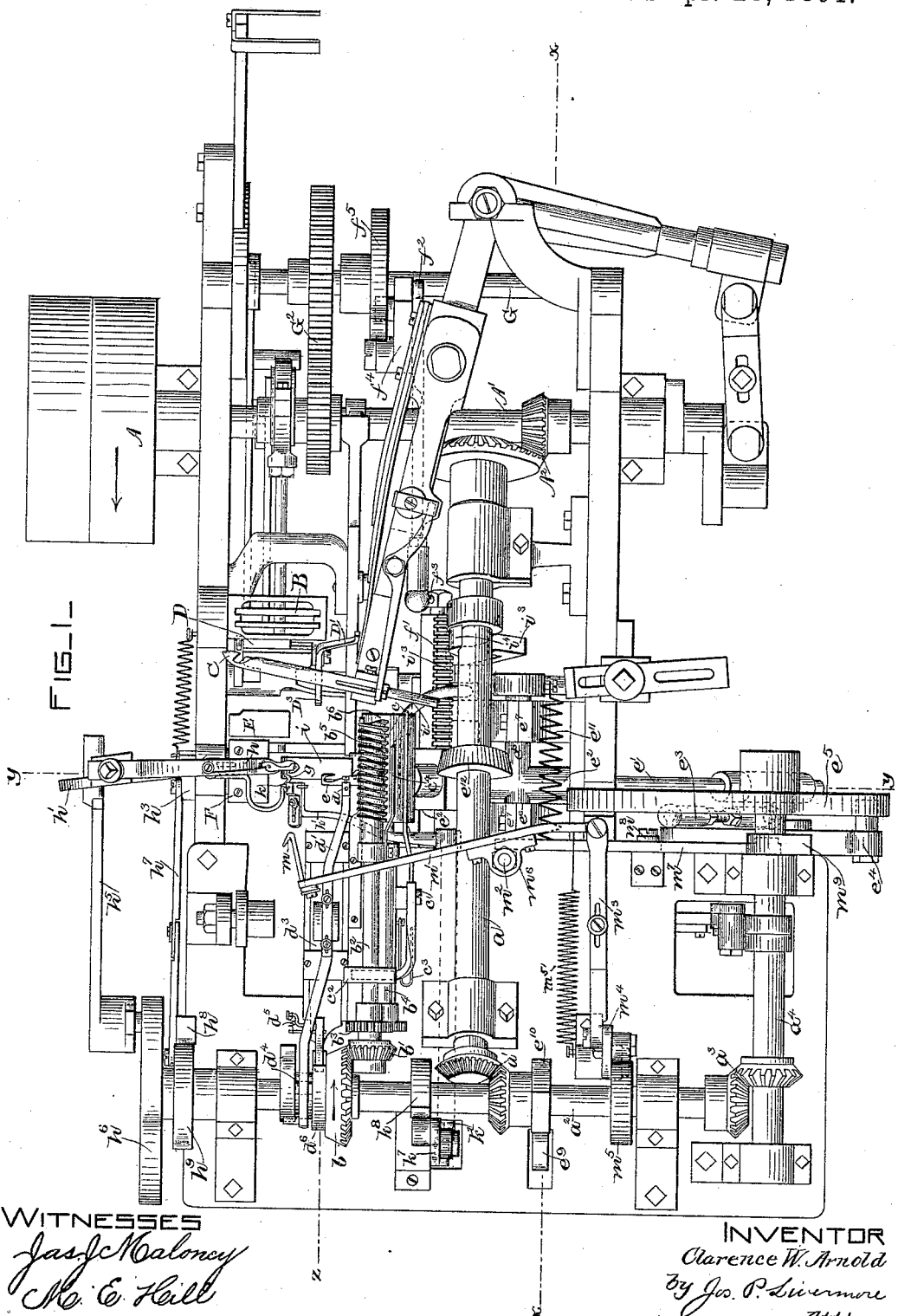

(No Model.)  
5 Sheets—Sheet 2.

C. W. ARNOLD.
FRINGE MAKING MACHINE.

No. 451,441. Patented Apr. 28, 1891.

WITNESSES  
Jas. J. Maloney  
M. E. Hill

INVENTOR  
Clarence W. Arnold,  
by Jos. P. Livermore  
Att'y.

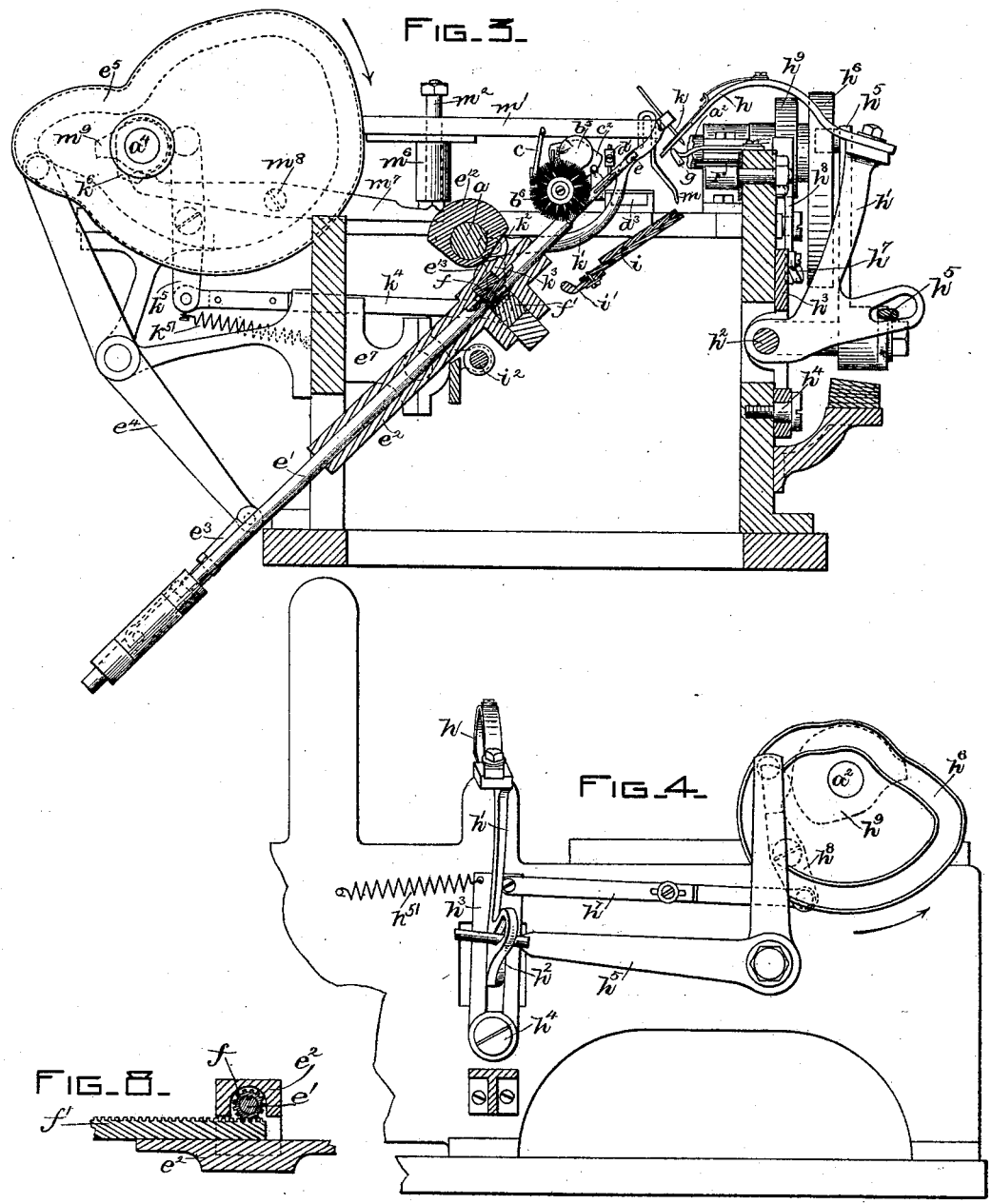

(No Model.) 5 Sheets—Sheet 4.
C. W. ARNOLD.
FRINGE MAKING MACHINE.
No. 451,441. Patented Apr. 28, 1891.
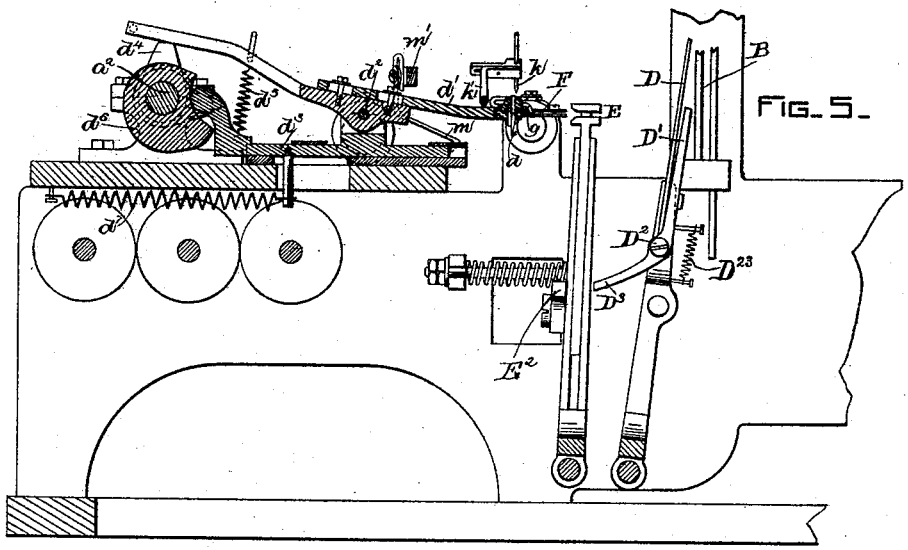
FIG. 5.
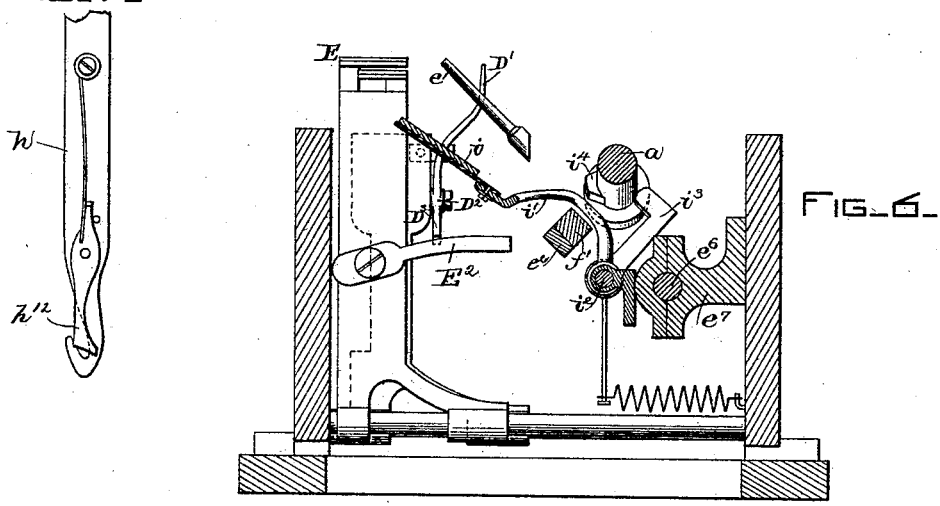
FIG. 9.
FIG. 6.
FIG. 7.
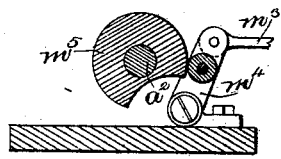
WITNESSES
Jas. J. Maloney
M. E. Hill
INVENTOR
Clarence W. Arnold
by Jos. P. Livermore
Atty.

(No Model.) 5 Sheets—Sheet 5.

C. W. ARNOLD.
FRINGE MAKING MACHINE.

No. 451,441. Patented Apr. 28, 1891.

WITNESSES
Jas. J. Maloney.
M. E. Hill.

INVENTOR
Clarence W. Arnold,
by Jos. P. Livermore
Atty.

ID_1
UNITED STATES PATENT OFFICE.

CLARENCE W. ARNOLD, OF WORCESTER, MASSACHUSETTS, ASSIGNOR TO EDWIN BROWN, TRUSTEE, OF SAME PLACE.

FRINGE-MAKING MACHINE.

SPECIFICATION forming part of Letters Patent No. 451,441, dated April 28, 1891.

Application filed September 21, 1887. Serial No. 250,314. (No model.)

*To all whom it may concern:*

Be it known that I, CLARENCE W. ARNOLD, of Worcester, county of Worcester, State of Massachusetts, have invented an Improvement in Fringe-Making Machines, of which the following description, in connection with the accompanying drawings, is a specification, like letters on the drawings representing like parts.

My invention relates to mechanism for tying knots—such as are now commonly tied by hand—in fringe to give the fringe an ornamental appearance, as well as to prevent the fabric from raveling.

Application, Serial No. 222,327, filed December 22, 1886, by Oliver Arnold, shows an apparatus for knotting the fringe-thread of a fabric and adapted to perform substantially the same work as the mechanism forming the subject of this invention, and I do not claim any of the devices shown in said former application.

The knotting mechanism forming the subject of this invention is shown in this instance as employed in connection with a fringe-loom, it being actuated positively in conjunction with the operative parts of the loom, so that the knotting mechanism is timed with relation to the feeding mechanism and acts on the tufts of weft-thread that form the fringe after they are woven into the warp-threads by the loom to form the fringe fabric. In this kind of fabric there are usually two or more weft-threads employed, which are carried through the open shed of warp-threads which form the head of the fringe and are cut off at some distance from said warp-threads, thus forming a tuft of fringe-threads at each pick of the loom. For convenience in description the end of the tuft or pick that is woven into the head of the fringe will be called the "fast end" and the other extremity will be called the "free end," and each tuft or bunch of filling-threads passing through one shed of the warp-threads will be called a "pick." In the operation of knotting each pick is tied together with the third pick from it by an overhand knot.

The knotting mechanism forming the subject of this invention might be employed separately from the loom to tie knots in the fringe of a fabric that has been previously woven, and the invention, so far as relates to the knotting mechanism, is not limited to the construction in which the mechanism is operated in conjunction with the loom upon which the fabric having the fringe to be knotted is woven. The different picks that are to be tied together are kept separate and stretched out from the head of the fabric, so as to be accessible to the knot-tying devices, by means of a separator and stretcher consisting of a worm or threaded drum and a brush, respectively, which devices are substantially the same as in the application before referred to, and are not herein claimed, except in combination with the novel knot-forming devices forming the subject of this invention. The novel knot-forming devices comprise, first, a gatherer or collector that brings the two picks that are to be tied together close to one another while still remaining stretched across from the head of the fabric to the separator; second, a hooked needle similar to the latched needle of a knitting-machine, which needle first engages the two picks that are brought together by the collector in its hook and then turns about half around, so that the two picks forming the one tuft to be tied are wound half-way around its shank, after which the needle is pushed up through the tuft that is wound around it, and the third device, consisting of a clamp that engages the free end of the tuft extending from the shank of the needle to the separator, which still holds the free end of the tuft, comes into operation and draws the free end of the tuft from the separator, carries it farther around the shank of the needle, and places it in the hook above the latch of the needle. The needle is then withdrawn, taking the free end of the tuft away from the clamp, the tuft being closed in the hook of the needle by the latch of the latter, so that it is drawn through the loop that is formed around the shank of the needle, and thus completes the knot. The needle to perform these operations has a to-and-fro lengthwise movement, a lateral movement, a rocking or oscillating movement, and a rotary movement, all of which are produced at proper times by suitable actuating mechanism forming part of this invention, although it is obvious that the actuating mechanism can be modified as to mechanical construction without departing from the invention, as any equivalent mechanism adapted to give the proper movements at the proper times might be employed. There are also various accessory devices which assist in controlling the threads while being operated upon by the main devices before mentioned, and in governing the position at which the knot is formed, as will be hereinafter more fully described.

Figure 2:
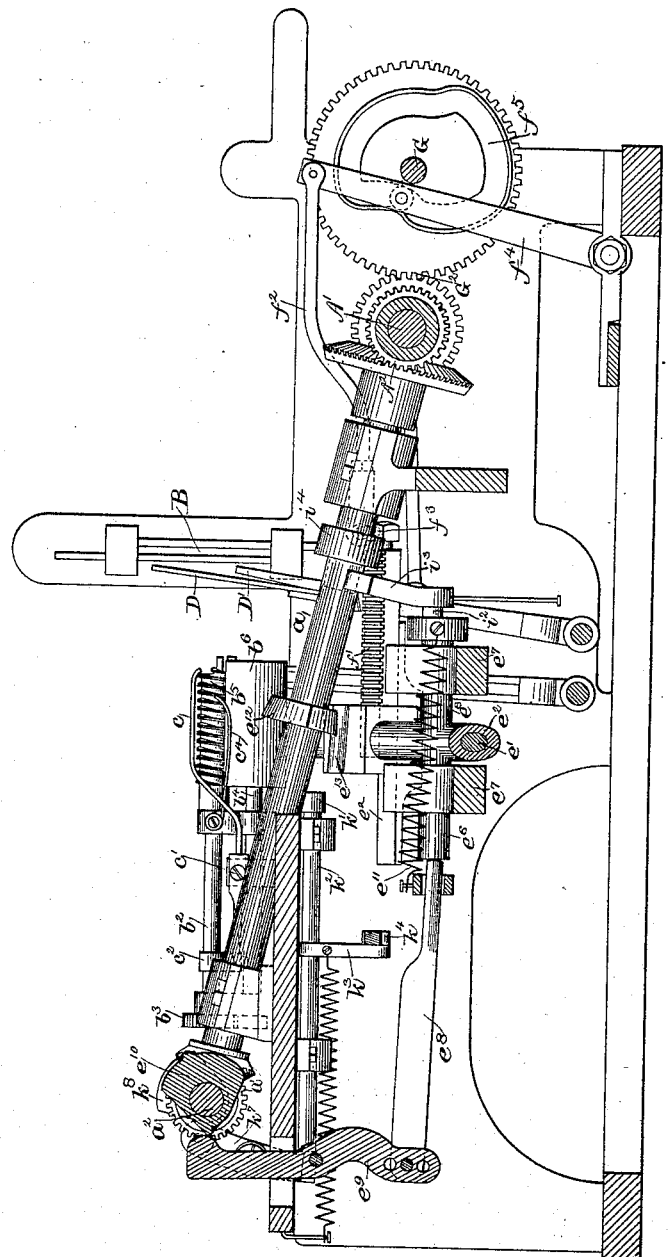
Figure 18:
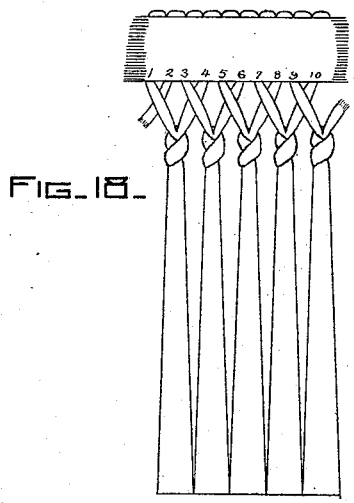

Figure 1 is a plan view of a knotting mechanism and a sufficient portion of a loom co-operating therewith to show the relation between the knotting mechanism and loom; Fig. 2, a longitudinal section thereof on line $x\,x$, Fig. 1; Fig. 3, a transverse vertical section on line $y\,y$, Fig. 1; Fig. 4, an elevation of a portion of the devices at the rear of the machine; Fig. 5, a longitudinal section on line $z$, Fig. 1; Fig. 6, a transverse sectional detail showing a friction device and its operating mechanism that co-operates with the knot-tying needle or hook when the latter is drawing up the knot; Figs. 7, 8, and 9, details to be referred to; Figs. 10 to 17, inclusive, diagrams illustrating the various steps in the operation of forming the knot, and Fig. 18 an illustration of a piece of the knotted fringe.

For convenience in description the side at which the actuating-pulley A stands (see Fig. 1) will be called the "rear of the machine."

The knob-forming mechanism forming the subject of this invention is shown in this instance as employed in conjunction with a loom of suitable construction to weave a fringed fabric, the said loom being actuated by means of a pulley A on the main shaft A', which, by means of suitable cams and actuating mechanism, operates the usual harness-frames or shedding mechanism B, the weft-drawing hook C, the lay D, and the temple or fabric-clamp E, all of which parts are shown in this instance as of substantially the same construction as that shown and described in application, Serial No. 224,026, filed by me January 11, 1887, to which reference may be had.

The main shaft A' of the loom is connected by beveled gearing $A^2$ with the main shaft $a$ of the knotting mechanism, and as two picks of thread are tied together in one knot one cycle of the knot-making operations will occupy the time of two cycles of the loom, and the beveled gearing $A^2$ is so proportioned that the shaft $a$ turns once at each two rotations of the shaft A'. The said shaft $a$ is connected by beveled gearing $a'$ with a shaft $a^2$, in turn connected by beveled gearing $a^3$ with a shaft $a^4$, all of which shafts $a$, $a^2$, and $a^4$ turn with the same speed. The said shaft $a^2$ actuates, by beveled gearing $b\,b'$, a shaft $b^2$, connected by gearing $b^3$ (see Fig. 2) with a shaft $b^4$, the gear $b'$ being so proportioned that the shaft $b^2$ turns twice at each rotation of the shafts $a$ and $a^2$, or once for each pick of the loom.

The shafts $b^2\,b^4$ respectively carry the separator $b^5$ and stretcher $b^6$, the former consisting of a worm or spirally-grooved drum and the latter of a brush, which co-operate to keep the successive picks of fringe separate from one another, one in each turn of the groove of the worm, and stretched out from the head of the fabric, as well as to feed the stretched separated picks forward to the knotting devices, the same as in application, Serial No. 222,327, filed by Oliver Arnold, before referred to, these stretching and separating devices not being herein claimed.

Figure 10:
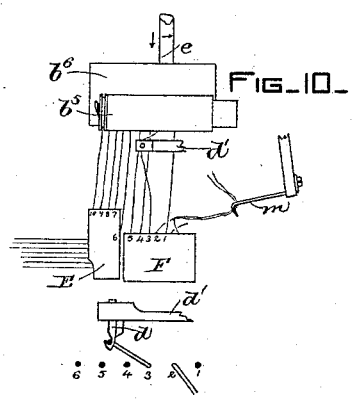
Figure 11:
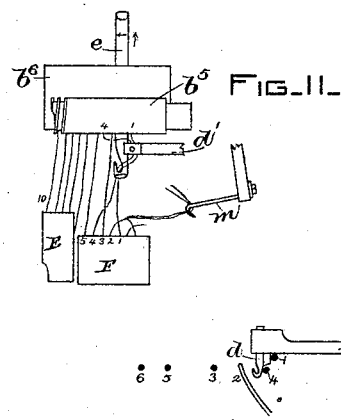
Figure 12:
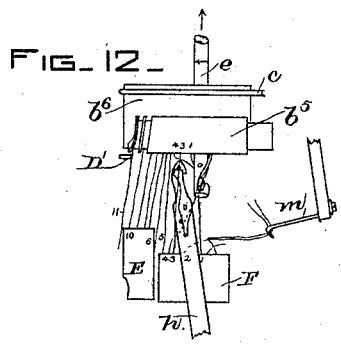
Figure 13:
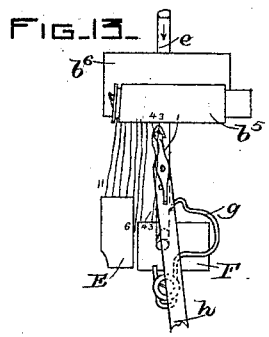
Figure 14:
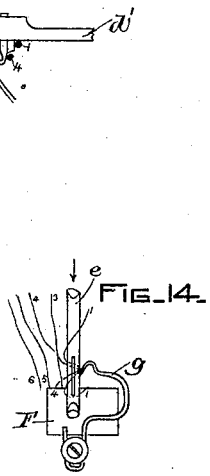
Figures 15, 16, 17:
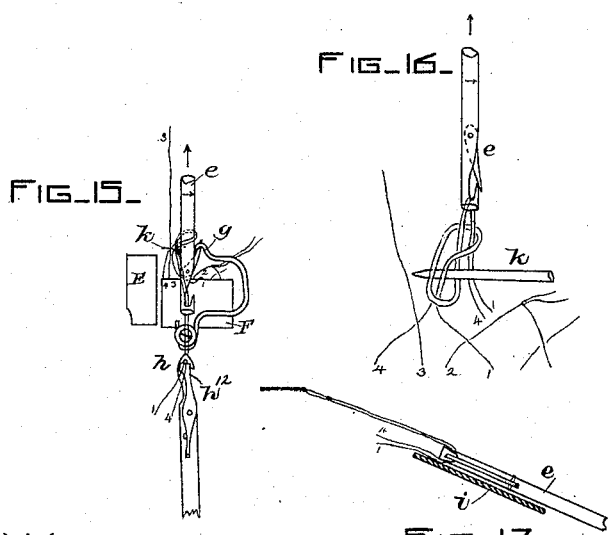

In order to insure that each pick of weft-thread shall properly pass to the separator $b^5$, the lay D of the loom is provided with a finger D', pivoted upon the side of the lay at $D^2$, Fig. 5, and having a finger $D^3$ that strikes the lower portion of the support for the temple E as the lay moves forward, so that the said finger D' moves faster than the lay and carries forward the pick of thread just as it is being cut off in the hook C of the loom, placing it over the upper part of the brush $b^6$, so that the end of the thread or spiral ridge of the separator $b^5$ will engage the said pick with certainty. The said finger D' is acted upon by a spring $D^{23}$, (clearly shown in Fig. 5,) that retains it in its normal position (shown in that figure) at the side of the lay, except when positively moved therefrom by the engagement of the finger $D^3$ with its stop $E^2$. At the same moment that the finger D' carries forward the pick of fringe-thread a finger $c$, parallel with the brush $b^6$ and pivoted at $c'$, is acted upon by a cam $c^2$ on the shaft $b^2$ and carries the end of the threads down upon the surface of the brush $b^6$, which thus acts as it rotates to stretch out and straighten the threads. A spring $c^3$ keeps the bent rear end of finger $c$ against the cam $c^2$. A stationary finger $c^4$ also assists in keeping the threads down upon the surface of the brush. The several picks of filling-thread are thus held stretched across from the warp-threads or head of the fabric, which passes between a pair of plates F, which serve to hold the fabric while the knot is being tied. The said fringe-threads are stretched across from between the plates F to the different turns of the groove in the separator $b^5$, which by rotating once at each pick of the loom advances the entire series of threads held by it a distance equal to the space between two adjacent threads at each pick of the loom. The first step toward tying a knot is to get the two picks of threads that are to be tied together into one tuft, which operation is performed by the collector $d$, (best shown in Fig. 5,) which collector consists of a hook supported on a rocking lever $d'$, pivoted at $d^2$ on a carriage $d^3$, having a sliding movement on the frame-work parallel with the line of warp-threads. The pick that is at the forward end of the line of picks held by the separator is to be tied to the third one from it—i.e., the fourth pick—the next one having already been tied to one in advance, and the third pick remaining to be tied by the next operation with the sixth pick, as will be best understood from Fig. 18. The collector-hook $d$ has an up-and-down movement, produced by a cam $d^4$ on the shaft $a^2$ and a spring $d^5$, by which the lever $d'$ is rocked, as best shown in Fig. 5. The hook $d$ is thus depressed at the side of the pick marked No. 3 in Figs. 10 and 11, which is to remain for the next operation, and the hook is then moved toward the said pick, so as to gather it up by the sliding movement of the carriage $d^3$, produced by a cam $d^6$ on the shaft $a^2$. The hook $d$ is then caused to rise by the spring $d^5$ in the further movement of the cam $d^4$, lifting the pick marked No. 3 over the pick marked No. 4, as clearly shown in Fig. 10, the sliding movement of the carriage $d^3$ being continued for this purpose, after which the hook is again depressed, falling between picks Nos. 4 and 5, Fig. 10, and is then moved back in the other direction by the spring $d^7$, which holds the cam projection on the carriage $d^3$ against the cam $d^6$, thus leaving pick No. 3, while the rear side of the shank of the hook $d$ carries pick No. 4 over to the side of pick No. 1, so that the two picks constitute one tuft ready to be acted upon and tied together by the other devices. The knotting needle or hook $e$ is now moved up with the open side of the hook next to the tuft composed of the two picks gathered by the collector $d$, is then moved laterally to receive the said tuft in its hook, and is then turned half around, as indicated in Figs. 11 and 12, to twist the tuft around its shank. These and the succeeding movements of the needle are accomplished by the mechanism now to be described. The said needle $e$ is formed at the end of a long shank or rod $e'$, having a longitudinal movement in a guide $e^2$, which longitudinal movement is produced by a pitman $e^3$, lever $e^4$, and cam $e^5$ on the shaft $a^4$, all of which parts are best shown in Fig. 3. The said guide $e^2$ is provided with trunnions $e^6$, having a rocking and sliding movement in bearings $e^7$, the sliding movement of said trunnions giving the bodily lateral movment of the needle, and being produced by a rod $e^8$, lever $e^9$, cam $e^{10}$, and spring $e^{11}$, which devices are best shown in Fig. 2. The rocking or oscillating movement of the needle on the trunnions $e^6$ as a bearing is produced by the cam $e^{12}$ (see Fig 3) on the main shaft $a$ of the knotting mechanism, the said cam acting upon a projection $e^{13}$ on the said guide $e^2$. The rotary movement of the needle is produced by the following devices, (shown in Figs 1, 2, 3, and 8:) The shaft $e'$ of the needle is grooved and connected by a key or spline with a pinion $f$, (see Fig. 8,) so that the needle is permitted to move endwise in the said pinion, although caused to rotate with it. The pinion $f$ meshes with a rack-bar $f'$, guided in a suitable transverse recess in the needle-guide $e^2$ and connected with a link $f^2$ by a ball-and-socket or universal joint $f^3$. The link $f^2$ is connected with a lever $f^4$, actuated by a cam $f^5$ on a shaft G, actuated from the main shaft $a'$ of the loom by gearing $G^2$, so proportioned that the shaft G turns once at each two rotations of the main shaft of the loom, the said shaft G being the one which operates the shedding mechanism of the loom. After the needle $e$ has engaged the tuft of thread collected by the hook $d$ it is turned half around by the rack $f'$ and is moved lengthwise up through the tuft of thread, which by such axial rotation is twisted around the needle so as to form a loop around the shank of the needle, the free ends of the threads being still retained in the separator $b^5$ and kept stretched tight by the rotation of the brush $b^6$. A thread-holding spring $g$ prevents the thread from being carried up with the needle, so that the endwise movement of the needle carries its hooked end and latch beyond the loop of thread which is twisted around the shank. The free ends of the threads extending from the shank of the needle to the separator $b^5$ are then engaged by a clamp $h$, (see Fig. 9,) which is connected with an arm $h'$, pivoted at $h^2$ on a swinging plate $h^3$, pivoted at $h^4$ on the frame-work, these parts and their actuating mechanism being best shown in Figs. 3 and 4. The arm $h'$ and clamp carried by it has a rocking movement of considerable range on the pivot $h^2$, produced by a lever $h^5$, actuated by a cam $h^6$ on the shaft $a^2$, by which movement the hook-shaped thread-engaging end of the clamp is moved down opposite the tuft of threads extending from the shank of the needle $e$ to the separator $b^5$. The said clamp is then moved laterally by means of a link $h^7$, connected with the swinging piece $h^3$, a lever $h^8$, and cam $h^9$ on the shaft $a^2$, the lever $h^8$ being held in contact with the cam by the spring $h^{51}$, and by this lateral movement its hooked end engages the threads between the needle $e$ and separator $b^5$, as shown in Figs. 12 and 13, and the spring-actuated latch $h^{12}$ of the said clamp (see Fig. 9) engages the said threads and fastens them in the hook. The clamp is then moved outward in the direction of the arrow, Fig. 3, drawing the free ends of the thread out from the separator and carrying them across the shank of the needle $e$ and over the portion of the same threads extending from the head of the fabric to the shank of the needle, after which by a further lateral movement of the clamp the free end of the threads is laid into the hook of the needle, which has by its rotating mechanism been turned to place the hook upward, as shown in Figs. 13 and 14, and after the free end of the tuft of threads has been placed in the hook of the needle $e$ by the clamp $h$ the needle begins its return or downward endwise movement, drawing the free ends of the thread with it out from the clamp $h$ and down through the loop formed by the same threads around the shanks of the needle, which closes, while the ends of the threads is drawn through the loop in the manner which will be readily understood by those familiar with the operation of latched knitting-needles. In order that the needle may draw the knot up tightly in its downward movement, a clamping device $i$ (best shown in Fig. 6) is carried up against the side of the needle so as to bear upon the free end of the thread between it and the needle, as shown in Fig. 17, so that by the aid of this clamping device the needle holds the thread firmly in its downward movement and draws the knot up tight. The said clamping device $i$ is carried by an arm $i'$ on a rock-shaft $i^2$, provided with an arm $i^3$ (best shown in Figs. 2 and 6,) operated by a cam $i^4$ on the main shaft $a$ of the knotting mechanism.

In order that the knot may always be tied at the proper distance from the head of the fabric or properly placed along the tuft of threads as it is drawn up, the loop through which the end of the thread is drawn by the needle $e$, as just described, is engaged by a knot-placing device $k$. The said knot-placer $k$ consists of a small pin or wire carried by an arm $k'$ on a rock-shaft $k^2$, having an arm $k^3$, connected by a link $k^4$ with a lever $k^5$, (see Fig. 3,) actuated by a cam $k^6$ on the shaft $a^4$, against which cam the lever is held by a spring $k^{51}$, as clearly shown in Fig. 3. These parts produce an upward and downward movement of the pin $k$ with relation to the knot that is being tied, it being carried down into the loop or knot just as it slips off from the hook $e$, so that as the free end of the thread is drawn by the needle it runs over the said knot, placing pin $k$, until finally the knot is drawn up tightly around said pin, which is then drawn out from the knot by its return movement in the opposite direction to that in which it was carried into the loop. In addition to the endwise movement of the pin $k$ into and out from the knot produced by turning its arm $k'$ on the shaft $k^2$ as an axis, the said pin has a lateral movement by which it is carried out of the way of the needle until a proper time for it to enter the loop, when it is brought forward into proper position to enter the said loop by its endwise movement. This lateral movement of the knot-placing pin $k$ is produced by an endwise movement of its shaft $k^2$, caused by a lever $k^7$ (best shown in Fig. 2) and cam $k^8$ on the shaft $a^2$. After the knot has been tied by the co-operation of the devices thus far described the knotted tuft is removed from the neighborhood of the knot-tying devices and carried forward in the direction of the feed of the fabric, so as to prevent any danger of its becoming entangled with the threads to be subsequently acted upon. The tuft remover or clearer by which this removal of the knotted tuft is effected consists of a device $m$, (shown as a hook-shaped piece of wire,) connected with a lever $m'$, pivoted on a stud or rod $m^2$, on which it is vibrated by a link $m^3$, connected with a lever $m^4$, actuated by a cam $m^5$ on the shaft $a^2$, as best shown in Fig. 1, and in the detail Fig. 7. This vibration produces a swinging movement of the hook $m$, by which the tuft of threads that has been tied is swept forward away from the knot-tying devices, as indicated in Figs. 10 and 11. The lever $m'$ is moved in the opposite direction to that in which it is positively moved by the cam $m^5$ by means of a spring $m^{51}$, (shown in Fig. 1,) that keeps the cam-roller on the lever $m^4$ up against the surface of the cam $m^5$. When the removing device or clearer $m$ swings back to engage the next tuft at the proper time, it has to be lifted up so as not to engage the tuft in its backward movement, and then after it has passed the tuft it has to drop down again, so as to engage and sweep forward the tuft. This upward and downward movement is provided for by the sliding of the pivoted socket $m^6$ of the arm $m'$ on its stud $m^2$, as will be understood from Fig. 3, and the movement is produced by a lever $m^7$, pivoted at $m^8$ and actuated by a cam $m^9$ on the shaft $a^4$, as best shown in Figs. 1 and 3.

The operation of the several devices produced by the actuating mechanism thus far described may be best understood by reference to Figs 10 to 17, inclusive, which show the successive steps in the operation in connection with a representation of the threads that are being acted upon. The different picks of thread extending from the head of the fabric within the holding-plate F to the separator and stretcher $b^5$ $b^6$ are numbered successively from 1 to 10, beginning with the pick most advanced and ending with the last pick that has been woven into the fabric and placed in the separator by the action of the lay D and finger D', carried by it. Pick No. 2 has already been tied together with a pick in advance, and the two forming the tuft that has just been knotted are being removed by the clearer $m$, as shown in Figs. 10 and 11. The collector $d$ then engages pick No. 3, lifts it over pick No. 4, and then descends and carries forward pick No. 4, placing it by the side of pick No. 1, as is clearly shown in the lower portion of the diagrams Figs. 10 and 11, which show the collector $d$ in side elevation, the upper portion of said diagrams showing the position of the collector $d$ with relation to the other parts, as seen in plan view. The needle $e$, which has been below the level of the threads while the collector $d$ was thus operating, is now moved endwise upward in advance of the collected picks 1 and 4, with its hook opening toward said picks, and the needle is then moved laterally to engage the two collected picks extending from the head of the fabric at F to the collector $d$, as shown in Fig. 11, after which the needle moves downward slightly to bring the threads into the end of the hook, and then turns half around on its axis to the position shown in Fig. 12, so that the tuft of threads composed of picks 1 and 4, which are still engaged at their free end by the separator and stretcher are, wound around the needle in and below its hooked portion. The clamp $h$ has in the meantime come forward, as shown in Fig. 12, so that its end is just over the threads, and the needle $e$ is then moved upward through the threads, which are wound around it, so that the said threads now extend around the shank of the needle below the hook, as shown in Fig. 14, the thread-holder $g$ preventing the thread from moving up with the needle. At the same time the clamp $h$ has moved downward and laterally from the position shown in Fig. 12, so as to gather the free end of the picks 1 and 4, extending from the shank of the needle to the separator, the spring-actuated latch $h^{12}$ moving aside to permit the thread to enter the hook of the clamp, and then as the said clamp begins its upward movement the latch $h^{12}$ closes over the threads, holding them with a sufficient firmness. The clamp then begins its upward movement, drawing the free ends of the threads out from the separator, and the rotary movement of the needle $e$ has in the meantime been continued, so that the opening of its hook now stands upward, as shown in Fig. 14, and the upward and lateral movement of the clamp $h$ is such that the free end of the thread held by it is carried across the needle $e$ above the latch and below the point of the hook, and is thus placed in the hook, as will be understood from Fig. 15, the needle then rotating still further, so as to more securely hold the thread, and then moving downward and drawing the free end of the thread out from the clamp $h$ and through the loop of the same thread, which is at this time around the shank of the needle $e$ below the latch, as shown in Fig. 15. While the needle $e$ is thus drawing the free end of the thread out from the clamp $h$ the placing device $k$ enters between the free end of the thread and the shank of the needle $e$, as shown in Fig. 15, so that as the free end of the thread is drawn down it runs over the said device $k$, as shown in Fig. 16, causing the knot to be drawn up tight at the point determined by the said placing device $k$. As the needle continues its downward movement from the position shown in Fig. 15 for the purpose of drawing up the knot the clamping device $i$ is brought up against the side of the needle, as shown in Fig. 17, thus holding the free end of the thread tightly between it and the side of the hook, so that the knot is drawn sufficiently tight.

Certain of the devices herein shown and described might be omitted without impairing the operativeness of the other devices. For example, if it were merely desired to tie tufts of thread together without producing the ornamental crossing of the upper part of the threads between the head of the fabric and the knots shown in Fig. 18, as is sometimes practiced in knotting fringe, the collector $d$ might be omitted and the needle and clamp would operate to tie knots in the tufts successively presented to it by the separator, which, it will be seen, also constitutes a feeding device by which the separate picks of threads are successively fed forward to the proper point to be operated upon by the knotting devices.

I claim—

1. The combination, in a machine for tying knots in fringe, of the weaving mechanism for weaving the heading and a separator for holding the different picks of filling-thread as they are received from the weaving mechanism with a needle, a bearing therefor, mechanism for moving said needle longitudinally, and mechanism for rotating the same, said needle engaging with one or more of the filling-threads confined between the heading and the separator, substantially as described.

2. The combination of the heading clamp or temple, a separator for the filling-thread, a needle mounted in a bearing, mechanism for reciprocating said needle, and mechanism for rotating the same with a movable clamp and mechanism for operating the same, whereby the thread is removed from the separator into and past the hook of the needle, which forms a knot in the filling-thread, substantially as described.

3. The combination of the heading clamp or temple, a separator for the filling-threads, a needle mounted in a bearing, mechanism for reciprocating said needle, and mechanism for rotating the same, whereby it will engage one or more of the threads confined between the heading-clamp and separator, with a collector engaging with one or more of the threads and bringing them in position for the needle to tie them into a knot, and mechanism for operating said collector, substantially as described.

4. The combination of a hooked knot-tying needle and a bearing in which the needle is mounted, said bearing being pivoted on the frame of the machine, with mechanism for rocking said frame and sliding it transversely on its pivots, and mechanism for reciprocating and revolving the needle in its bearing, substantially as and for the purpose set forth.

5. The combination of a hooked knot-tying needle, a bearing therefor, mechanism for reciprocating and rotating said needle, whereby it engages with the threads, a reciprocating clamp which engages with the threads and draws them into the hook of the needle, means for reciprocating the clamp, a clamping or friction plate co-operating with the needle, and mechanism for operating said plate, substantially as and for the purpose set forth.

6. The combination of the knot-tying needle, mechanism for reciprocating and rotating the same, and a clamp for co-operating with said needle, with a clearing-hook for removing the tied threads away from the path of the lever and clamp, substantially as described.

7. The combination of the heddles of a fringe-loom, the lay, heading clamp or temple, a separator for the filling-threads, a weft-inserter, and a needle for tying the knots in said filling-thread, with a lever pivoted on the said lay and a stop co-operating with said lever by which the pick of a thread when beaten up by the lay is carried up into the separator, substantially as described.

8. The combination of the heading clamp or temple, a separator for the filling-threads, a knot-tying needle, mechanism for reciprocating and rotating the same, a clamp co-operating with said needle, mechanism for operating said clamp, a knot-placing device, and mechanism for operating said knot-placing device, substantially as and for the purpose set forth.

9. The combination of a hooked knot-tying needle, a bearing therefor, and mechanism, substantially as described, for moving the needle both longitudinally and transversely and for rotating the same, with a clamp engaging the threads and co operating with the needle, and a loop-holding device for the thread on the shank of the needle, substantially as described.

10. The combination, in a knot-tying machine, of the rotating separator and brush by which the threads to be knotted are separated, and a finger, with mechanism for vibrating the same, said finger forcing the threads onto the brush as they are received, substantially as described.

In testimony whereof I have signed my name to this specification in the presence of two subscribing witnesses.

CLARENCE W. ARNOLD.

Witnesses:
G. N. ESTABROOK,
HENRY E. HILL.